Figure 1:
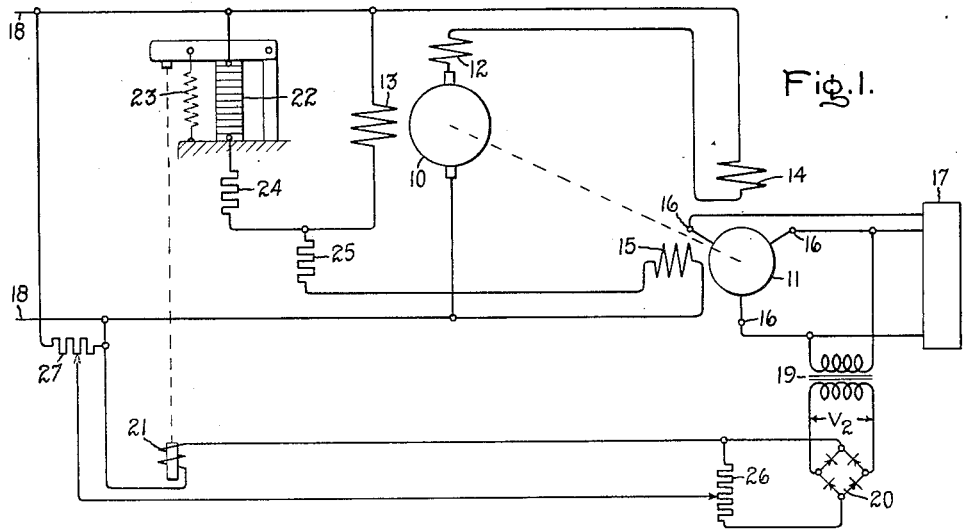

March 4, 1952  A. FISHER  2,588,319

DYNAMOELECTRIC MACHINE REGULATING SYSTEM

Filed March 14, 1951

Inventor:
Alec Fisher,
by Ernest H Britton
His Attorney.

Patented Mar. 4, 1952

2,588,319

UNITED STATES PATENT OFFICE 2,588,319

DYNAMOELECTRIC MACHINE REGULATING SYSTEM

Alec Fisher, Lynn, Mass., assignor to General Electric Company, a corporation of New York Application March 14, 1951, Serial No. 215,490

6 Claims. (Cl. 322—16)

My invention relates to dynamoelectric machine regulation, and has significance in connection with a motor alternator set adapted to provide substantially constant voltage and frequency output when powered from a fluctuating supply of D.-C. voltage.

In many applications it is necessary to depend upon a variable voltage D.-C. source of power (for example, from a railway car axle driven generator or from a marine or air-craft prime mover driven generator) for A.-C. apparatus such as electronic communication equipment or fluorescent lights. It has long been known to change the D.-C. to A.-C. by the use of a motor alternator set and many arrangements have been known in the past for controlling the output voltage and frequency of such sets. The use of two separate mechanical regulators, one for output frequency and one for output voltage, allows a close regulation but the requisite apparatus has been found quite complex, expensive to install and difficult to keep in proper adjustment. Except for the use of such a separate mechanical regulator for each of the two functions, none of the prior art arrangements provide regulation of both voltage and frequency which is suitably close for many applications, especially when there are wide fluctuations of D.-C. input and of applied A.-C. load.

It is an object of the present invention to provide simple and inexpensive means for overcoming the above mentioned difficulties.

Another object of the invention is to provide for a motor alternator set operable from a fluctuating supply of D.-C. voltage, a regulating system allowing maximum regulation of both output voltage and output frequency with a minimum amount of regulating apparatus.

Briefly stated, in accordance with one aspect of the invention, with a motor alternator set as above described I achieve the close dual regulation while eliminating dual regulators for the frequency and voltage functions by arranging mechanical regulating means responsive to frequency and operable to hold motor speed (and consequently alternator speed and output frequency) constant, while alternator voltage is held constant by keeping alternator excitation substantially constant through the use of all-electric means (including the inherent design characteristics of the system) for varying the drop across an alternator field winding disproportionately with respect to voltage applied to the circuit in which said field is included. In accordance with another aspect of the invention, conventional frequency regulating means are combined with an interconnection of motor and alternator field windings in such a manner that increasing the field current through one of these windings automatically decreases the current through the other so that by regulating one machine with a conventional regulator, the tendency is to arrive at the correct field current for the other machine by matching its inherent design characteristics.

Other objects and advantages of the invention will become apparent and the invention will be better understood from the following description taken in connection with the accompanying drawing, and the scope of the invention will be pointed out in the appended claims.

Figure 2:
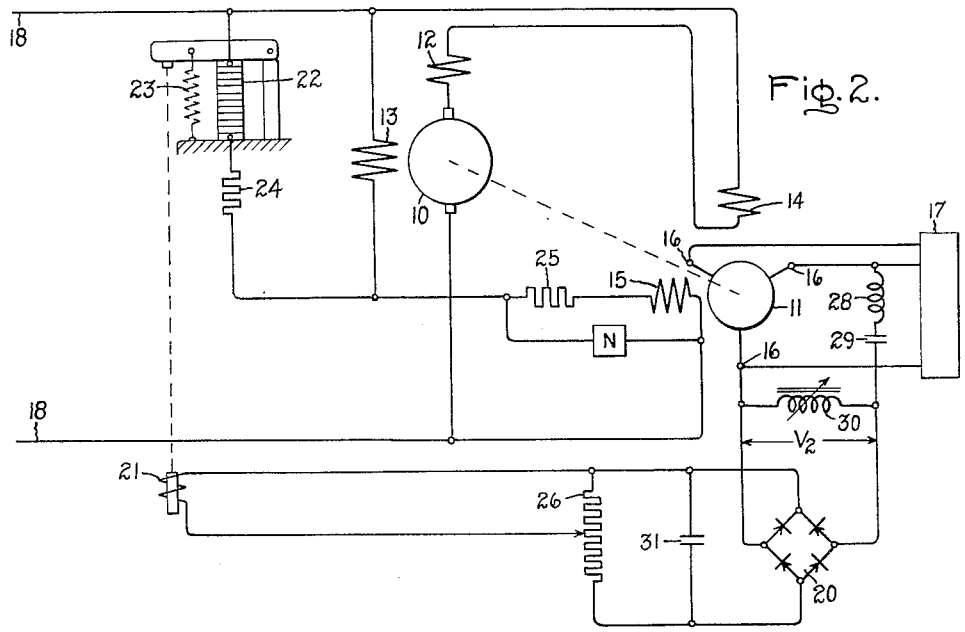

In the drawing, Fig. 1 is a circuit diagram of a motor alternator set having a regulating system constructed in accordance with a preferred embodiment of the invention; and Fig. 2 is a circuit diagram of a motor alternator set and regulating system illustrating modifications.

Referring to Fig. 1 of the drawing, I have shown dynamoelectric apparatus for converting direct current into alternating current comprising a D.-C. motor having an armature 10 connected to drive an A.-C. generator 11. The D.-C. motor has a first field winding 12 and a second field winding 13 and the A.-C. alternator is provided with a first field winding 14 and a second field winding 15. The alternator is provided with output terminals 16 which are shown connected to a load 17 assumed to be of varying power (but constant frequency and voltage) requirements. Since any change in alternator output current will be reflected as a change in driving motor armature current, I have shown motor first field winding 12 and alternator first field winding 14 both arranged in series with armature 10 and connected to be supplied from fluctuating voltage D.-C. supply lines 18, so that the series connected fields will compensate for increased load current. I provide means for also varying the motor excitation responsive to the frequency of the alternator output and in the arrangement illustrated in Fig. 1 this comprises a so-called constant potential transformer 19 which may be of the saturated type and which those skilled in the art will recognize as a device giving an output voltage which (within limits) will be sensitive to the input frequency. The primary winding of transformer 19 is connected across a pair of the generator output terminals 16 and the secondary winding of the transformer 19 is connected to a full-wave rectifier 20, the rectified output of which controls the energization of a solenoid coil 21 of a mechanical regulator which in the illustrated embodiment comprises a carbon pile 22 adapted to be spring compressed by a spring 23 biased against the effect of solenoid coil 21 so that the carbon pile will be spread (or decompressed) when coil 21 is excited and the carbon pile will be compressed (to lower the effective resistance of the regulator) when coil 21 is unexcited. As shown in Fig. 1, the carbon pile is connected in series with an ordinary linear resistor 24 and the series circuit of pile 22 and resistor 24 is connected across the second motor field winding 13 with this parallel circuit arranged in series with a linear resistance 25 and alternator second field winding 15, with the entire circuit energized by being placed across the line 18. If desired, the action of the regulator may be made manually adjustable by inserting, as shown, an adjustable potentiometer 26 interposed between rectifier 20 and coil 21. In Fig. 1 I have also shown the regulator coil compounded by a quantity responsive to D.-C. input across the wires 18 and made manually adjustable by a potentiometer 27.

Referring now to Fig. 2 in which like parts have been like numbered and need not be redescribed, it is seen that the field windings 12 and 14 are again shown in series with the armature 10 so that the motor excitation provided by winding 12 and the alternator excitation provided by winding 14 will still be responsive to armature current to provide desirable compounding although it should be understood that this feature is not essential and the field windings 12 and 14 could be omitted entirely without doing violence to the spirit of the present invention. In Fig. 2 the alternator output frequency responsive means comprises a tuned circuit utilizing well known resonant circuit principles and in the illustrated embodiment comprising a series connected reactor 28 and capacitor 29 as well as an adjustable reactor 30 connected in parallel with the tuned circuit responsive load comprising rectifier 20, potentiometer 26 and solenoid coil 21. If desired, a smoothing capacitor 31 may be placed across the rectifier output terminals. The arrangement of solenoid coil 21 operating a carbon pile regulator 22 is somewhat the same in Fig. 2 (as in Fig. 1) but in Fig. 2 the circuit for alternator field winding 15 (and consequently the interconnection between alternator second field winding 15 and motor second field winding 13) is somewhat similar to an arrangement described and claimed in copending application Serial No. 215,516, filed March 14, 1951, jointly by myself and P. Lebenbaum and assigned to the assignee of the present invention. In the last mentioned application there is disclosed an arrangement whereby motor and alternator adapted to be driven thereby are each provided with two field exciting windings with one winding of each machine connected to be energized in accordance with armature current drawn by the motor. The other field exciting winding of the motor is energized in series circuit with a plurality of parallel circuits one of which includes the other field exciting winding of the generator and the other of which includes a non-linear resistor having a negative voltage resistance characteristic. While such an arrangement (without any mechanical regulator) is entirely satisfactory when not more than 5 per cent regulation of voltage or frequency is desired and when the input voltage and output load does not fluctuate over extremely wide limits, the arrangement is not entirely suitable for all applications and closer overall voltage and frequency regulation can be obtained with wider limits of input voltage fluctuation and of output load power requirements by modifying the circuit of the application as shown in Fig. 2 of the present application to include frequency sensitive means adapted to actuate a mechanical regulator connected to affect the circuit of the associated motor field winding. Thus, in Fig. 2, the alternator second field winding 15 is connected in parallel with a negative voltage resistance characteristic resistance N and the parallel circuit of field winding 15 and resistance N is connected in series with motor field 13 and pile 22a across the fluctuating voltage source at lines 18. By negative voltage resistance characteristic, it is meant that resistor N has the property of reducing its resistance with an increase in voltage thereto applied. Such a resistor may be constructed of a special ceramic resistance material such as that disclosed and claimed in Patent 1,822,744, granted September 8, 1931 to K. D. McEachron, and assigned to the assignee of the present invention.

With operation of either of the embodiments illustrated in Figs. 1 and 2, the secondary voltage identified on the two figures as V2 will (within limits of normal operation) be proportional to the frequency of the A.-C. generator output and since this voltage is fed into the mechanical regulating means connected to effect the energization of the principal motor field exciting winding (and, consequently, affect the speed of the motor and alternator) the arrangement will serve to maintain frequency of the system at a constant value.

The speed of an ordinary D.-C. motor tends to rise with increasing voltage but frequency sensitive regulation as shown can serve to keep the speed constant. If there is an inherent regulation drop in the carbon pile or other mechanical regulator it may be desirable to introduce a compounding circuit as shown by the circuit including resistance 27 in Fig. 1 to provide a correction in the regulator coil circuit as a function of D.-C. voltage input appearing across this potential resistor 27.

However, with either of the embodiments of Figs. 1–2 as the effective resistance of the regulator 22 changes to adjust the motor field 13 to the proper value to maintain correct speed, the voltage across the generator field 15 is caused to remain substantially constant. This effect is created as follows:

With the arrangement shown in Fig. 1 as the D.-C. line voltage across wires 18 increases, the voltage across the motor armature 10 increases and therefore, additional field strength is required to maintain constant speed. The entire system is preferably so designed, particularly with reference to the point of operation on the motor saturation curve, that the variable part of the D.-C. line voltage is completely absorbed by the motor field 13 and series resistance 25, leaving essentially constant potential across the generator field 15. Preferably the A.-C. generator is designed to run highly saturated although the generator series field 14 in the motor armature circuit may still be effective for compounding purposes.

With the arrangement shown in Fig. 2, an increase in D.-C. voltage across the lines 18 with consequent increased voltage across the motor armature will tend to cause the motor to speed up but at the same time the increased voltage across winding 13 will increase the field strength of the motor tending to slow it down (to provide rough regulation) and close regulation of speed is at the same time provided by the frequency sensitive means operating the mechanical regulator in the circuit of this motor field. Meanwhile, alternator output voltage is held substantially constant by holding constant alternator excitation (except for any compounding from field 14) since as the voltage across line 18 increases, either winding 13 and pile 22a "hog" a major portion of the increase or the voltage across res'stance N increases so that an increased current through N will cause a larger drop through the series connected winding 13 and resistance 22a and, therefore, make less voltage available to energize alternator field winding 15 thus to maintain substantially constant alternator excitation. With either of the embodiments of Figs. 1–2, it may be found desirable to compound the fields 12 and 13 of the motor and cumulatively compound field windings 14 and 15 of the alternator, as explained in the copending Lebenbaum and Fisher application already referred to, in order that under any load it will be possible to maintain constant output frequency and constant output voltage by compensating for the increased drops in the two machines themselves.

However, it should be observed that with any of the embodiments a constant voltage output is obtained through having an alternator field winding (which may be regarded as the principal alternator field winding since the other is optional and provided only for compounding) arranged in a circuit which provides means for causing the field winding current to remain substantially constant despite change of voltage applied to the circuit in which it is connected. In Fig. 1, this means includes the regulator provided for frequency regulation and the parallel connected motor field winding 13 and the series connected linear resistance 25; in Fig. 2 this means for maintaining constant field current by varying the proportionate drop across the field includes a combination of parallel connected negative resistance characteristic material N and a series connection with the circuit of motor field winding 13 and the associated regulator.

Actual tests have indicated that with use of the invention it lies within the province of the ordinary designer to achieve plus or minus 3 per cent voltage regulation and plus or minus 1 per cent frequency regulation even though the D.-C. input voltage varies over a wide range such as from 240 to 375 volts and even with a substantial load change, for example, from 6 kw. down to 2½ kw. The system has the advantage that the frequency is not sensitive to the power factor of the load, and essentially constant potential and constant frequency are obtained although only a single regulator is used.

While I have shown and described particular embodiments of my invention, it will be obvious to those skilled in the art that changes and modifications may be made without departing from the invention in its broader aspects, and I therefore aim in the appended claims to cover all such changes and modifications as fall within the true spirit and scope of my invention.

What I claim as new and desire to secure by Letters Patent of the United States is:

1. In a regulating system for a D.-C. motor—A.-C. alternator set adapted to operate from a variable voltage D.-C. input to supply substantially constant voltage and frequency A.-C. output, the combination of a field exciting winding for said motor, a mechanical regulator arranged in the circuit of said motor field winding to affect the current therethrough, said regulator being arranged responsive to the frequency of said output, a field exciting winding for said alternator, and circuit connecting means for placing said alternator field winding in series circuit with the circuit of said motor field winding and said regulator all in circuit across said input thereby to maintain substantially constant current through said alternator field winding and consequent constant voltage output despite variations of load or input voltage.

2. In a regulating system for a D.-C. motor adapted to be operated from a fluctuating supply of D.-C. voltage and an A.-C. alternator arranged to be driven by said motor, the combination of means for exciting said motor responsive to motor armature current, means for exciting said alternator responsive to motor armature current, means including a mechanical regulator arranged responsive to output frequency for additionally exciting said motor responsive to output frequency, and means for additionally exciting said alternator with a substantially constant component of excitation, said last means including an alternator field exciting winding and associated circuit means for energizing said winding from said fluctuating supply of D.-C. voltage while causing the current through said winding to remain substantially constant despite fluctuations of said voltage, whereby said regulating system adapts said motor alternator to supply substantially constant voltage and frequency output.

3. A regulating system for direct current to alternating current energy transformation dynamoelectric apparatus comprising a D.-C. motor having an armature and first and second field exciting windings and an A.-C. alternator connected to be driven by said motor and having output terminals and first and second field exciting windings, said regulating system comprising a variable voltage source of direct current energy, an alternating current load of varying power requirements, means including connections from said source through said motor armature and through said motor and alternator first field windings for energizing said windings responsive to current in said armature, means for energizing said motor second field winding, said last means including connections from said source through said second field winding, means including a mechanical regulator for controlling the energization of said second motor field winding, frequency responsive means arranged responsive to the frequency of the output of said alternator and connected to affect the operation of said mechanical regulating means, and means for energizing said alternator second field winding, said last mentioned means including connections interposed in the circuit means for energizing said second motor field winding in such manner that as the current through one of said second windings is increased that through the other is decreased, whereby there is provided a simple regulating system capable of holding close regulation of both output voltage and frequency.

4. The combination as in claim 3 further characterized by said frequency responsive means comprising a constant potential transformer of the saturated type having primary and secondary windings with said primary winding connected to said alternator output connections and said secondary winding connected to affect the operation of said mechanical regulating means.

5. Dynamoelectric apparatus for converting direct current into alternating current and comprising a D.-C. motor having an armature connected to drive an A.-C. generator, means for energizing the field exciting system of said motor responsive to motor armature current, means for energizing the field exciting system of said generator responsive to motor armature current, means including a motor field exciting winding for energizing the field excitation system of said motor responsive to the frequency of the output of said generator, said last means including a frequency responsive device operatively associated with said generator and a mechanical carbon pile regulator interposed between said device and the electrical circuit of said last mentioned motor field exciting winding, and substantially all electric means for regulating the output voltage of said generator, said last mentioned means comprising a field exciting winding for said generator arranged in series circuit with said mechanical regulator and said motor field exciting winding with the design constants of said system so chosen as to hold generator output voltage at a constant value despite variations of input voltage or output load.

6. A dynamoelectric machine regulating system for a pair of dynamoelectric machines comprising a D.-C. motor and an A.-C. alternator connected to be driven thereby, said motor having an armature and first and second field exciting windings and said generator having a rotor, output terminals and first and second field exciting windings, said system comprising connections for exciting said first motor field winding and said first generator field exciting winding in accordance with armature current drawn by said motor from said source, connections for energizing said second field exciting winding of said motor in series circuit with a plurality of parallel circuits one of which comprises said second field exciting winding of said generator and the other of which includes a non-linear resistor having a negative voltage resistance characteristic, regulating means including a mechanical regulator connected to additionally affect the energization of said second motor field winding, and means connected to vary the effect of said mechanical regulator responsive to output frequency of said generator, said last mentioned means including a constant potential transformer connected across output terminals of said generator.

ALEC FISHER.

No references cited.